A. F. DE RAIGNAU.
ELECTRIC WATER HEATER.
APPLICATION FILED OCT. 4, 1920.

1,386,607.

Patented Aug. 9, 1921.
2 SHEETS—SHEET 1.

Inventor
Adrien Frappier de Raignau
By
Attorney

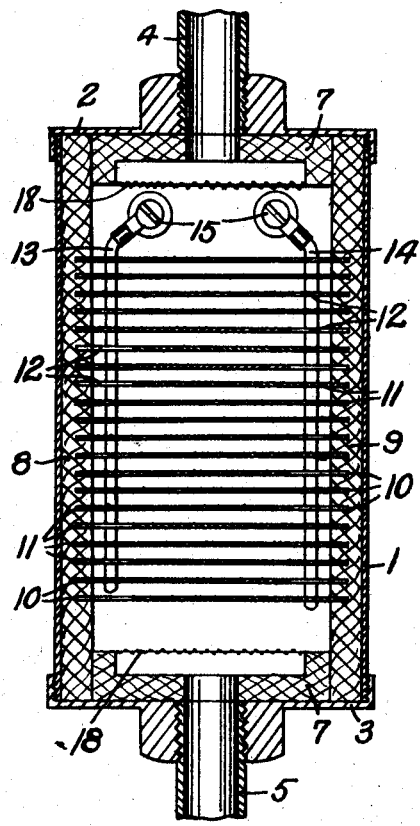
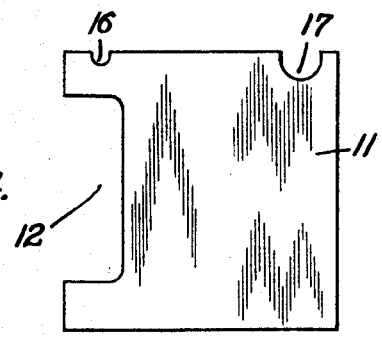

UNITED STATES PATENT OFFICE.

ADRIEN FRAPPIER DE RAIGNAU, OF MONTREAL, QUEBEC, CANADA.

ELECTRIC WATER-HEATER.

1,386,607. Specification of Letters Patent. Patented Aug. 9, 1921.

Application filed October 4, 1920. Serial No. 414,570.

*To all whom it may concern:*

Be it known that I, ADRIEN FRAPPIER DE RAIGNAU, a British subject, scientist, residing at #739 Demontigny street, East, Montreal, Province of Quebec, Dominion of Canada, have invented certain new and useful Improvements in Electric Water-Heaters; and I do hereby declare that the following is a full, clear, and exact description of the same.

The present invention relates to improvements in electric water heaters, and its main object is to devise a device of this character that will be of simple and cheap construction, and in which the heating elements will cover a relatively large area.

The invention will be better understood with the aid of the accompanying drawings in which:—

Fig. 3 is a vertical sectional view through the heater.

Fig. 4 is a plan view of one of the heating elements.

Like numerals of reference indicate corresponding parts in each figure.

Figure 1:
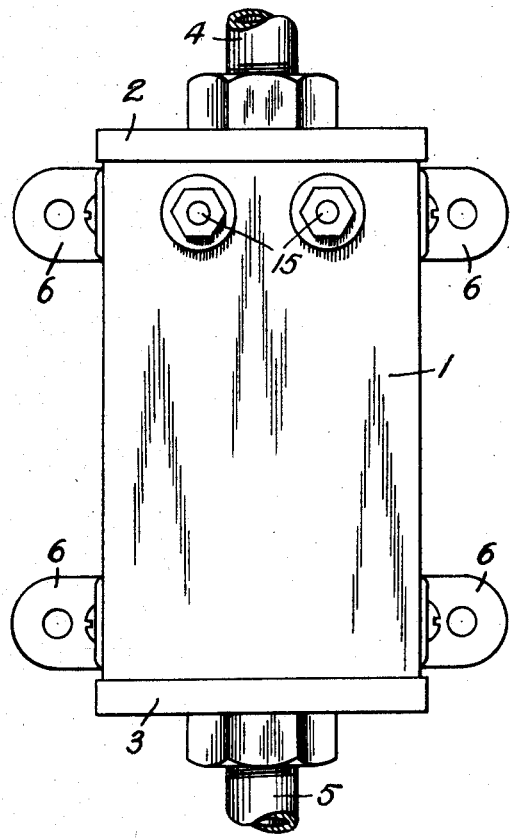
Figure 1 is an elevation of the heater.
Figure 2:
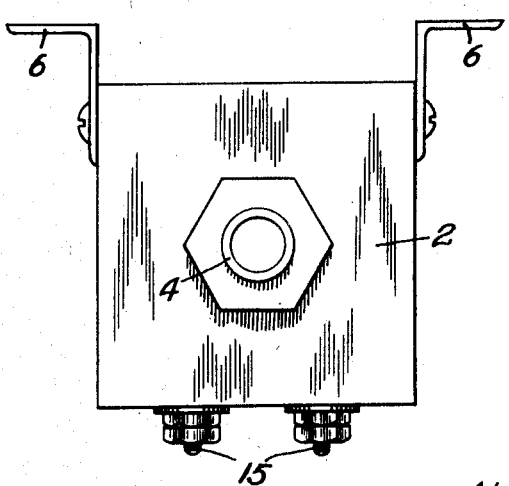
Fig. 2 is a top view of the heater.

Referring to the drawings, 1 is the outer casing preferably of sheet metal, having two covering caps 2 and 3, adapted to close each of its ends, each of said caps having respectively a water inlet 4 and water outlet 5. On each side of said casing 1 are provided suitable supporting brackets 6 to secure the heater to a wall.

The inner side of said casing 1 and caps 2 and 3 are lined with a wooden casing having sides 7, 8 and 9, forming an inner casing, said boards being shellacked or otherwise treated to prevent the wood from absorbing moisture. Two of the sides 8 or 9 of said inner casing are adapted to support the heating elements, which consists in providing a plurality of suitably distanced transverse and parallel recesses 10 therein; and the heating elements 11 are secured in superposed arrangement, across the said casing. The heating elements 11 consist of a plurality of large rectangular plates of conductive material such as copper, each having on one side thereof, in staggered arrangement, an opening 12 through which the water passes, thus forcing the water to pass over each plate in a zig-zag circulation, so that when these elements are heated, the water will contact with a plurality of large heating surfaces, thus heating the same in a relatively short time.

The elements or plates 11 are electrically connected by means of two poles 13 and 14, which are connected to the terminals 15, that project through the casing so that they can be connected with a suitable supply of electric energy. The pole 13 preferably connects every second element, while the pole 14 connects every intermediate element. The elements 11 are provided on one side thereof with a hole 16, adapted to receive one of the poles and a larger hole 17 through which the other pole may pass without being electrically connected thereto. Any suitable means may be used to electrically connect the poles to the elements.

On each end of said casing is provided a filtering net 18 to prevent some of the impurities in the water from reaching the elements, thus insuring a better service.

It will readily be seen that in a heater of this character, the water will be practically instantaneously heated, and at very little expense of electric energy.

What I claim as my invention is:—

1. An electric water heater comprising a wooden casing covered on its inner side with an impermeable coating; a water inlet and outlet in said casing; a plurality of heating elements, each consisting of a single plate of conductive material disposed in parallel relation to one another and secured in the sides of said casing; a water opening intermediate of each of said plates arranged in staggered arrangement in relation to one another, adjacent one edge thereof; and means to electrically connect said plates in batteries, substantially as described.

2. An electric water heater comprising a casing; a water inlet and outlet in said casing; a plurality of heating elements, each consisting of a single plate of conductive material disposed in parallel relation to one another and secured in the sides of said casing; a water opening intermediate of each of said plates arranged in staggered arrangement in relation to one another adjacent one edge thereof; an opening in each of said plates for an electrical connection to pass therethrough; and electrical connections adapted to electrically connect each second plate together, in batteries, substantially as described.

3. An electric water heater comprising a wooden casing covered on its inner side with an impermeable coating; a plurality of parallel recesses in the inner sides of said casing; a water inlet and a water outlet in said casing; a plurality of heating elements, each consisting of a single plate of conductive material disposed in parallel relation to one another and suitably secured in said recesses; a water opening intermediate of each of said plates arranged in staggered arrangement in relation to one another adjacent one edge thereof; an opening in each of said plates for an electrical connection to pass therethrough; and an electrical connection adapted to electrically connect each second plate together, in batteries, substantially as described.

Signed at Montreal, Quebec, Canada, this 18th day of September, 1920.

ADRIEN FRAPPIER de RAIGNAU.

Witnesses:
    C. PATENAUDE,
    G. BEAUDOIN.